(12) United States Patent
Adachi et al.

(10) Patent No.: US 9,216,861 B2
(45) Date of Patent: Dec. 22, 2015

(54) CONVEYOR AND CONVEYING METHOD

(71) Applicants: Nissan Motor Co., Ltd., Yokohama-shi, Kanagawa (JP); Automotive Energy Supply Corporation, Zama-shi, Kanagawa (JP)

(72) Inventors: Atsushi Adachi, Zama (JP); Tetsurou Tashiro, Sagamihara (JP); Shinji Ishimatsu, Yokohama (JP); Yasufumi Okazaki, Yamato (JP)

(73) Assignees: Nissan Motor Co., Ltd., Yokohama (JP); Automotive Energy Supply Corporation, Zama-shi (JP)

( * ) Notice: Subject to any disclaimer, the term of this patent is extended or adjusted under 35 U.S.C. 154(b) by 0 days.

(21) Appl. No.: 14/371,213

(22) PCT Filed: Feb. 13, 2013

(86) PCT No.: PCT/JP2013/053377
§ 371 (c)(1),
(2) Date: Jul. 9, 2014

(87) PCT Pub. No.: WO2013/122093
PCT Pub. Date: Aug. 22, 2013

(65) Prior Publication Data
US 2015/0005929 A1    Jan. 1, 2015

(30) Foreign Application Priority Data

Feb. 13, 2012  (JP) ................................. 2012-028385

(51) Int. Cl.
*B65H 20/24*    (2006.01)
*B65G 43/00*    (2006.01)
(Continued)

(52) U.S. Cl.
CPC .............. *B65G 43/00* (2013.01); *B65H 20/24* (2013.01); *H01M 10/0409* (2013.01); *B65H 2301/4491* (2013.01); *B65H 2404/1441* (2013.01); *H01M 10/0525* (2013.01)

(58) Field of Classification Search
CPC ........... B65G 43/08; B65H 2301/4491; B65H 20/24; B65H 2404/1441
See application file for complete search history.

(56) References Cited

U.S. PATENT DOCUMENTS 2,932,508 A * 4/1960 Tennler ......................... 226/114
4,228,513 A * 10/1980 Doljack ................... 198/810.02
(Continued)

FOREIGN PATENT DOCUMENTS

| JP | 57-133825 A | 8/1982 |
| JP | 60-107031 U | 7/1985 |

(Continued)

*Primary Examiner* — Gene Crawford
*Assistant Examiner* — Thomas Randazzo
(74) *Attorney, Agent, or Firm* — Global IP Counselors, LLP

(57) ABSTRACT

A conveyor is provided with a conveyor section, a controller, a confirming part and a detecting part. The conveyor section conveys a belt-shaped work having a plurality of reference points arrayed discontinuously on a surface. The controller selectively operates the conveyor section for intermittently conveying the work for each prescribed interval as a first conveying mode and continuously conveying the work as a second conveying mode. The controller further operates continues the first conveying mode when the reference points are confirmed by a confirming part during the first conveying mode and switching to the second conveying mode when the reference points are not confirmed by the confirming part. The controller further continues the second conveying mode until the reference points are detected by the detecting part during the second conveying mode and switching to the first conveying mode when the reference points are detected by the detecting part.

8 Claims, 19 Drawing Sheets

(51) Int. Cl.
   *H01M 10/04*       (2006.01)
   *H01M 10/0525*       (2010.01)

(56)          References Cited

U.S. PATENT DOCUMENTS 4,236,955 A  * 12/1980  Prittie .......................... 156/353
   5,235,515 A  *  8/1993  Ungpiyakul et al. ......... 700/125
   5,825,374 A  * 10/1998  Albertalli et al. ............. 346/136
   5,966,218 A  * 10/1999  Bokelman et al. ............ 356/429

6,845,283 B2 *  1/2005  Popp et al. .................... 700/130
   7,894,934 B2 *  2/2011  Wallace et al. ............... 700/230
   2010/0276466 A1 * 11/2010  Kameda ........................ 226/124
   2011/0049210 A1 *  3/2011  Kameda .......................... 226/46
   2012/0251270 A1 * 10/2012  Speller et al. ..................... 412/8

FOREIGN PATENT DOCUMENTS

JP          4-190920 A      7/1992
   JP         10-181962 A      7/1998
   JP       2009-256052 A     11/2009

* cited by examiner

CONVEYOR AND CONVEYING METHOD

CROSS-REFERENCE TO RELATED APPLICATIONS

This application is a U.S. National stage of International Application No. PCT/JP2013/053377, filed Feb. 13, 2013. This application claims priority to Japanese Patent Application No. 2012-028385, filed on Feb. 13, 2012. The entire disclosure of Japanese Patent Application No. 2012-028385 is hereby incorporated herein by reference.

BACKGROUND

1. Field of the Invention

The present invention relates to a conveyor and a conveying method for conveying a belt-shaped work.

2. Background Information

Cells comprising an electrode assembly wherein multiple positive electrodes and negative electrodes as electrodes are superposed together with separators in between have been used over the past several years. As a method for manufacturing the electrode assembly in such cells, Patent Document 1: Japanese Laid-Open Patent Application No. 2009-256052, for example, discloses a method for manufacturing a roll-shaped electrode assembly by superposing a belt-shaped cell material, which is the material of the electrodes and the separators, and winding the cell material around a winding shaft while the cell material is drawn out from a supply roll on which the cell material has been wound. The rotating speeds of the supply roll and the winding shaft are controlled by a motor.

SUMMARY

Meanwhile, when there is little cell material remaining, it is conceivable to replace the supply roll and connecting an ending edge of the cell material on the old supply roll with a leading end of the cell material on the new supply roll to maintain continuity of supply. However, with this method, a portion where the cell materials are connected is formed, this portion being undesirable as a product. The connection portion also becomes difficult to identify when the cell material is conveyed at high speed.

The present invention was created in order to solve the abovementioned problem, and an object is to provide a conveyor and a conveying method that can identify an undesirable portion on a product of a work of even while the work is conveyed at high speed, and can move the work to a proper position after that identification.

The conveyor according to the present invention comprises conveying means, confirming means, detecting means, and control means. The conveying-out means conveys a belt-shaped work having a plurality of reference points arrayed discontinuously on a surface, intermittently conveying the work for each prescribed interval as a first conveying mode or continuously conveying the work as a second conveying mode. The confirming means confirms a reference point on the work from a fixed position when the work intermittently stopped in the first conveying mode. The detecting means monitors the work conveyed using the second conveying mode and detects the reference point. The control means continues the first conveying mode when the reference point is confirmed by the confirming means during the first conveying mode, and switches to the second conveying mode when the reference point is not confirmed by the confirming means. The control means furthermore continues the second conveying mode until the reference point is detected by the detecting means during the second conveying mode, and switches to the first conveying mode when the reference point was detected by the detecting means.

BRIEF DESCRIPTION OF THE DRAWINGS

Referring now to the attached drawings which form a part of this original disclosure.

FIG. 22 is a plan view of the automatic joining section showing when a new supply roll is conveyed in.

DETAILED DESCRIPTION OF THE EMBODIMENTS

Figure 1:
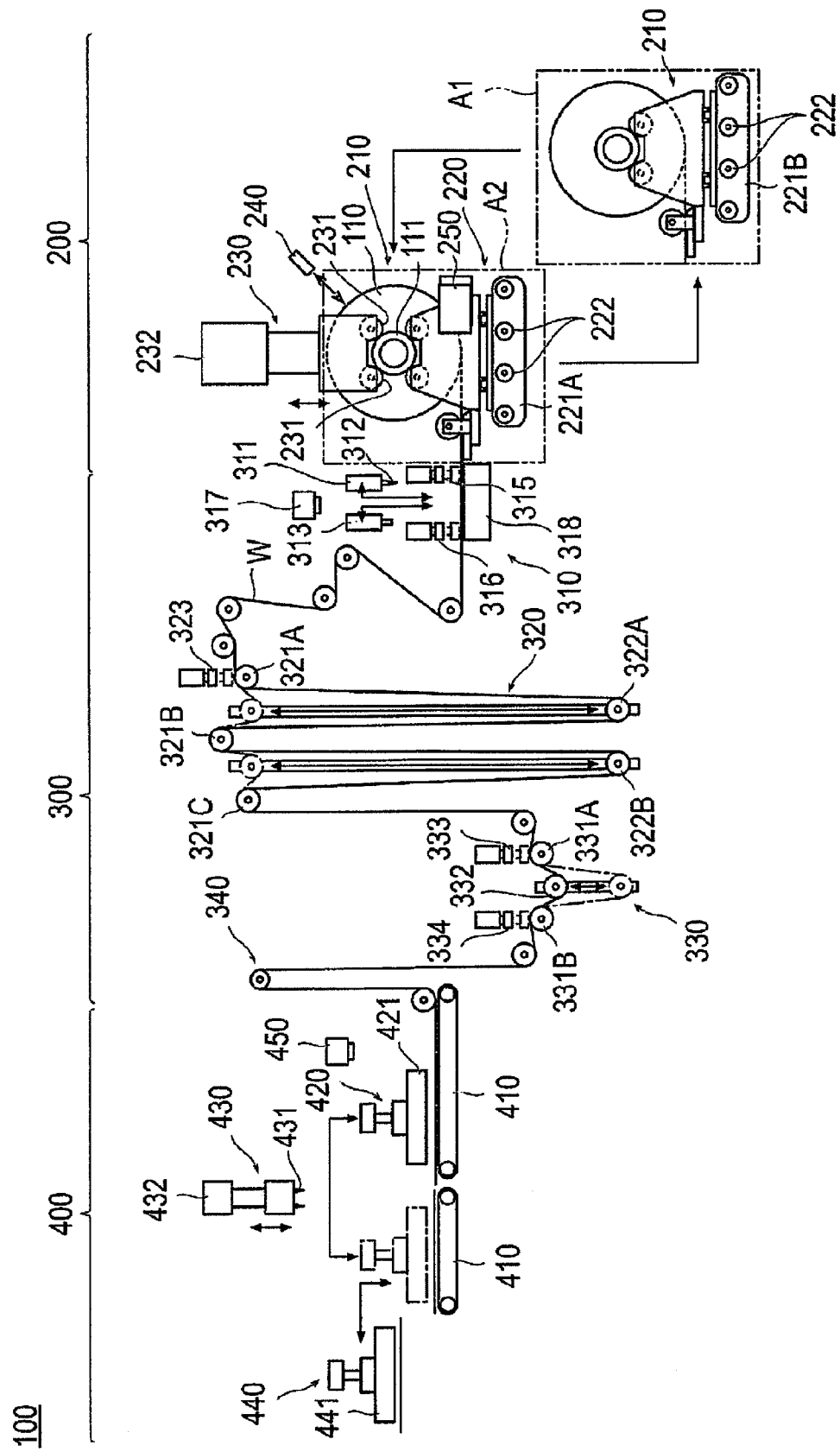
FIG. 1 is a schematic diagram showing a conveyor according to the present embodiment.

An embodiment of the present invention is described below with reference to the accompanying drawings. In the description of the drawings, the same elements are denoted by the same symbols, and redundant descriptions are omitted. Dimensional ratios in the drawings are exaggerated for the sake of the descriptions and are different from the actual ratios.

A conveyor 100 according to the present embodiment is an apparatus for cutting out electrodes from a belt-shape cell material W, which is a material for electrodes or separators constituting cells, while the cell material W is conveyed by being drawn out from a supply roll 110 on which the cell material is wound, as shown in FIG. 1.

First, the cell 10 will be described with reference to FIGS. 2 and 3.

Figure 2:
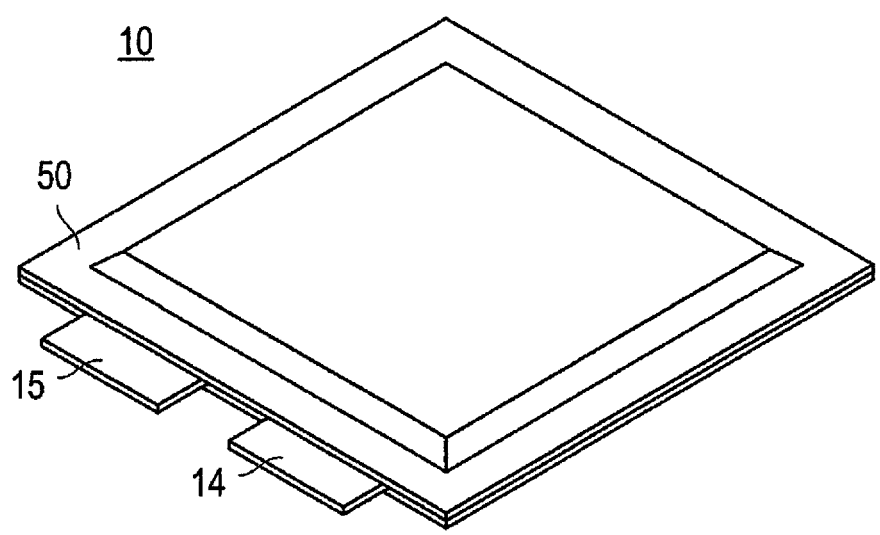
FIG. 2 is a perspective view showing a flat cell.
Figure 3:
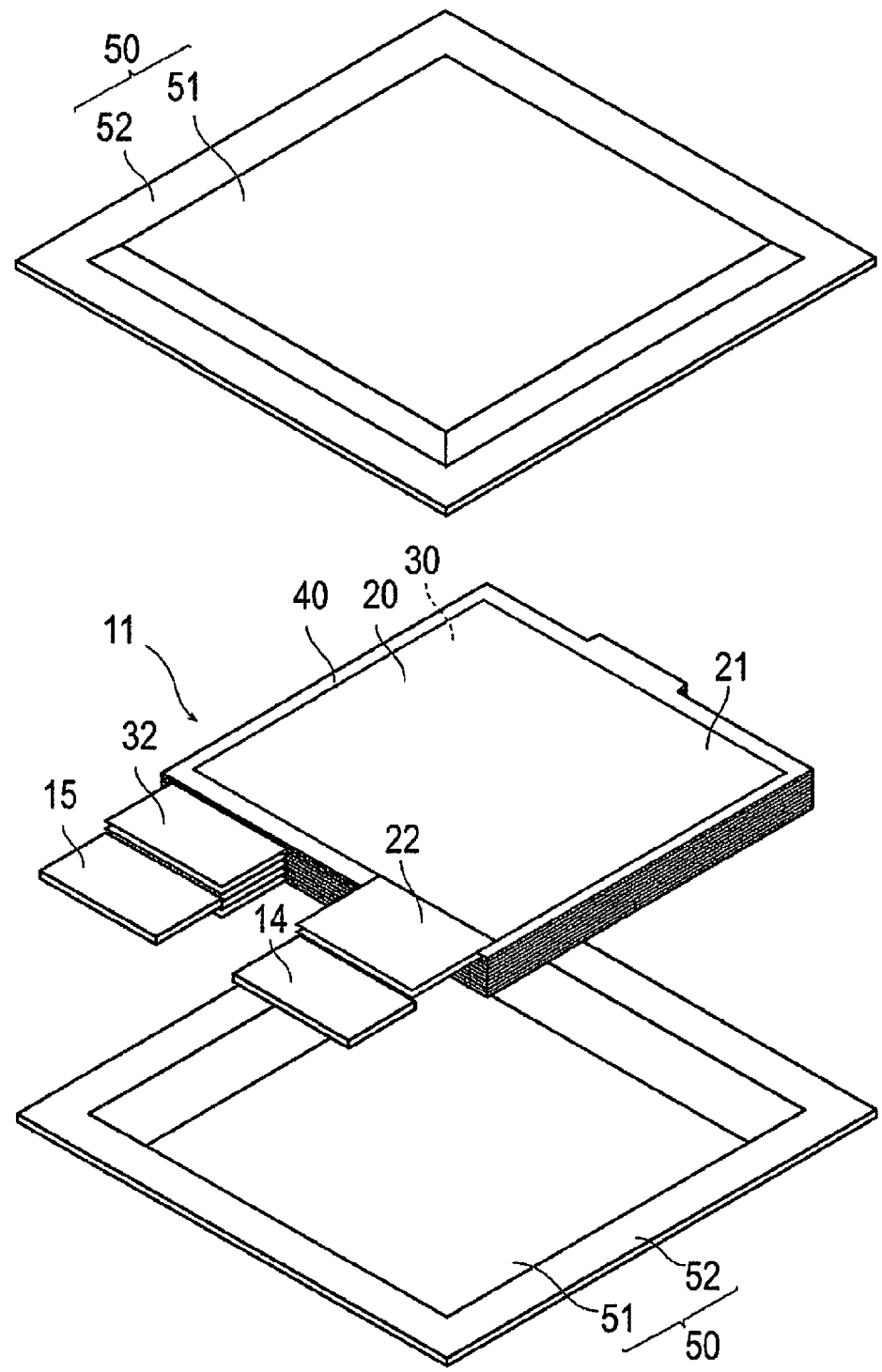
FIG. 3 is an exploded perspective view showing the flat cell.

The cell 10 is, e.g., a flat lithium ion secondary cell in which a stacked electrode assembly 11 is stored together with an electrolyte inside an exterior member 50, as shown in FIGS. 2 and 3. The cell 10 has a positive electrode lead 14 and a negative electrode lead 15 led to the exterior out of the exterior member 50.

The stacked electrode assembly 11 is formed by sequentially stacking a positive electrode 20, a negative electrode 30, and a separator 40. The positive electrode 20 has a positive electrode active material layer composed of a lithium-transition metal complex oxide such as $LiMn_2O_4$. The negative electrode 30 has a negative electrode active material layer composed of carbon and a lithium-transition metal complex oxide, for example. The separator 40 is formed, e.g., from porous polyethylene (PE) that is breathable enough for electrolyte to permeate.

The positive electrode 20 is formed into a substantially rectangular shape, and is made by forming positive electrode active material layers 21 on both sides of an extremely thin sheet-shaped positive electrode current collector. In the positive electrode 20, a positive electrode tab 22 connected to the positive electrode lead 14 is formed in the end without coating the positive electrode current collector with the positive electrode active material.

The negative electrode 30 is formed into a substantially rectangular shape, and is made by forming negative electrode active material layers on both sides of an extremely thin sheet-shaped negative electrode current collector. In the negative electrode 30, a negative electrode tab 32 connected to the negative electrode lead 15 is formed in the end without coating the negative electrode current collector with the negative electrode active material.

In terms of reducing weight and heat conductivity, the exterior member 50 is made of a sheet material such as a polymer-metal composite laminate film of aluminum, stainless steel, nickel, copper, or another metal (including alloys) coated with an insulator such as a polypropylene film. The exterior member 50 has a main body part 51 covering the stacked electrode assembly 11 and an outer peripheral part 52 extending from the peripheral edge of the main body part 51, and part or all of the outer peripheral part 52 is bonded by heat fusion.

Next, the conveyor 100 according to the present embodiment is described. In the present embodiment, the description is given using the positive electrode 20 as the element that is cut out, but the description applies also to the cutting out of the negative electrode 30 or the separator 40.

Figure 4:
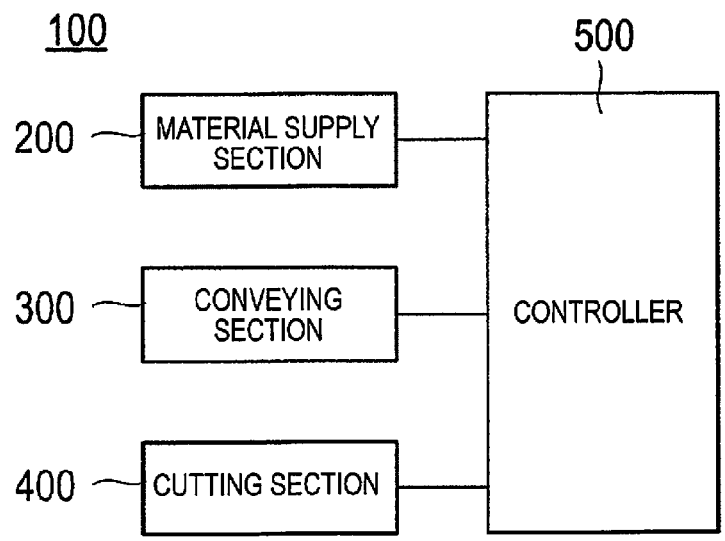
FIG. 4 is a schematic configuration diagram showing the conveyor according to the present embodiment.

The conveyor 100 comprises a material supply section 200 for supplying a belt-shaped cell material W, which is the material of the positive electrode 20, from the supply roll 110 around which the cell material W is wound, and a conveying section 300 (conveying means) for conveying the supplied cell material W while the cell material is folded back by a plurality of rollers, as shown in FIGS. 1 and 4. The conveyor 100 further comprises a cutting section 400 for cutting electrodes from the fed cell material W and conveying the electrodes, and a controller 500 (control means) for collectively controlling the entire conveyor 100.

The material supply section 200 comprises a roll support base 210 for rotatably holding the supply roll 110, a support base movement mechanism 220 for automatically moving the roll support base 210 toward or away from the conveying section 300, and brake force applying means 230 for applying brake force to the rotation of the supply roll 110. The material supply section 200 further comprises roll detection means 240 (detection means) for measuring the thickness of the cell material W wound around the supply roll 110, and roll position correction means 250 for correcting the position of the supply roll 110.

Figure 5:
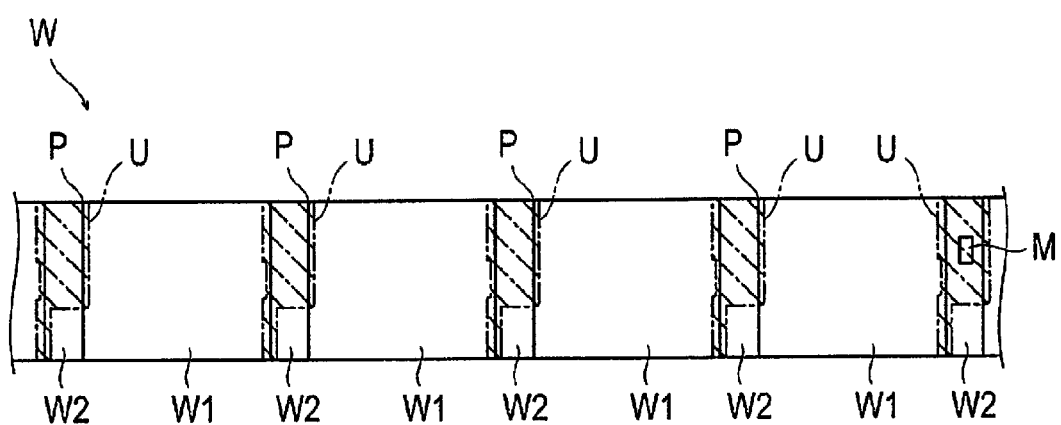
FIG. 5 is a plan view showing the cell material.

The supply roll 110 is formed by winding a fixed width of cell material W around a cylindrical core 111, the cell material being narrower in width than the core 111. The cell material W in the present embodiment, which is used for a positive electrode, contains an alternating arrangement of coated portions W1 which are electroconductive members (base material) as positive electrode current collectors coated with a positive electrode active material, and uncoated portions W2 which are not coated with a positive electrode active material, as shown in FIG. 5. Punched regions U indicated by dotted lines in FIG. 5 are successively punched out from the cell material W and regions surrounded by the punched regions U are cut out as electrodes 20, at which time a portion of the coated portion W1 configures a positive electrode active material layer 21 and a portion of the uncoated portion W2 configures a positive electrode tab 22. A ending edge mark M for indicating that an ending edge is approaching when successively drawing the cell material W out from an outer perimeter side is provided on an ending edge (the end positioned on an inner perimeter side of the supply roll 110) of the cell material W and somewhat toward a leading end side (an outer perimeter side of the supply roll 110). The ending edge mark M is formed, for example, with a hole, or the like.

Figure 6:
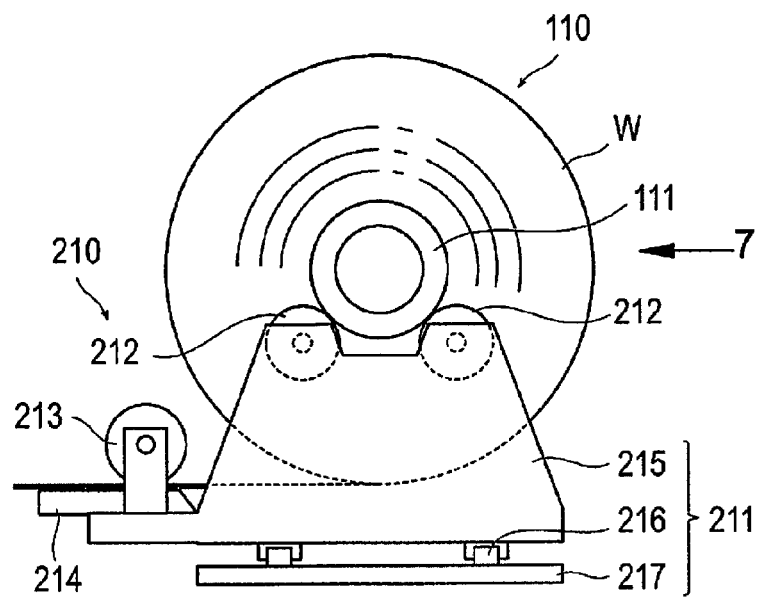
FIG. 6 is a plan view showing a roll support base for supporting the supply roll.
Figure 7:
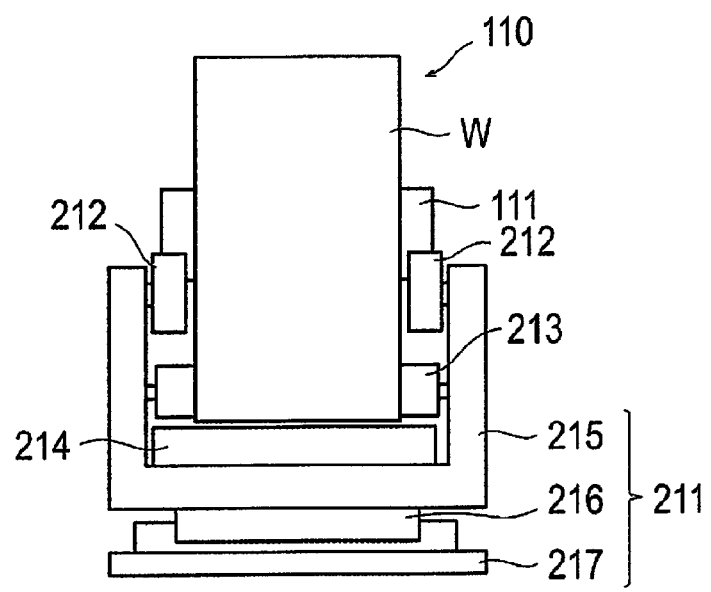
FIG. 7 is a plan view showing the roll support base observed from the direction of line 7 in FIG. 6.

The roll support base 210 comprises a support base main body part 211 constituting a frame, holding rollers 212 for rotatably holding the core 111, and a rotating roller 213 and a holding plate 214 in contact with the cell material W drawn out from the supply roll 110, as shown in FIGS. 6 and 7.

The support base main body part 211 comprises an upper support part 215 constituting a frame for holding the supply roll 110, a bottom base 216 provided to the bottom edge, and a linear guide 217 for moveably supporting the support base main body part 211 relative to the bottom base 216. The upper support part 215 is disposed in the upper part of the bottom base 216 via the linear guide 217, and thereby can move along the axial direction of the supply roll 110.

The holding rollers 212, which correspond to the respective ends of the core 111 of the supply roll 110, are aligned in twos to be substantially horizontal, apart from each other at a gap that is smaller than the diameter of the core 111, and are able to rotate freely relative to the upper support part 215. Therefore, the supply roll 110 can be rotatably supported by disposing the core 111 above and between two holding rollers 212 aligned substantially horizontally.

The rotating roller 213 is rotatably attached to the upper support part 215, and the cell material W drawn out from the supply roll 110 is held at a fixed height between the rotating roller and the holding plate 214 which is fixed to the upper support part 215.

The support base movement mechanism 220 comprises two moving bases 221A, 221B capable of moving up and down as well as moving horizontally as shown in FIG. 1, and movement mechanisms (not shown) for moving the moving bases 221A, 221B up and down as well as horizontally.

The roll support base 210 can be placed on both the moving bases 221A, 221B, the roll support base 210 placed at a convey in/out position A1 can be conveyed to a connecting position A2 adjacent to the conveying section 300, and the roll support base 210 can be conveyed from the connecting position A2 to the convey in/out position A1. The moving bases 221A, 221B comprise a plurality of support base movement rollers 222 that enable the roll support base 210 to move horizontally in order to make it easier to convey the roll support base 210 in and out. Both the moving bases 221A, 221B are capable of moving individually, and an old supply roll 110 from which the cell material W has been used up can be conveyed out by one moving base 221A, while a new supply roll 110 can be conveyed in by the other moving base 221B.

Figure 8:
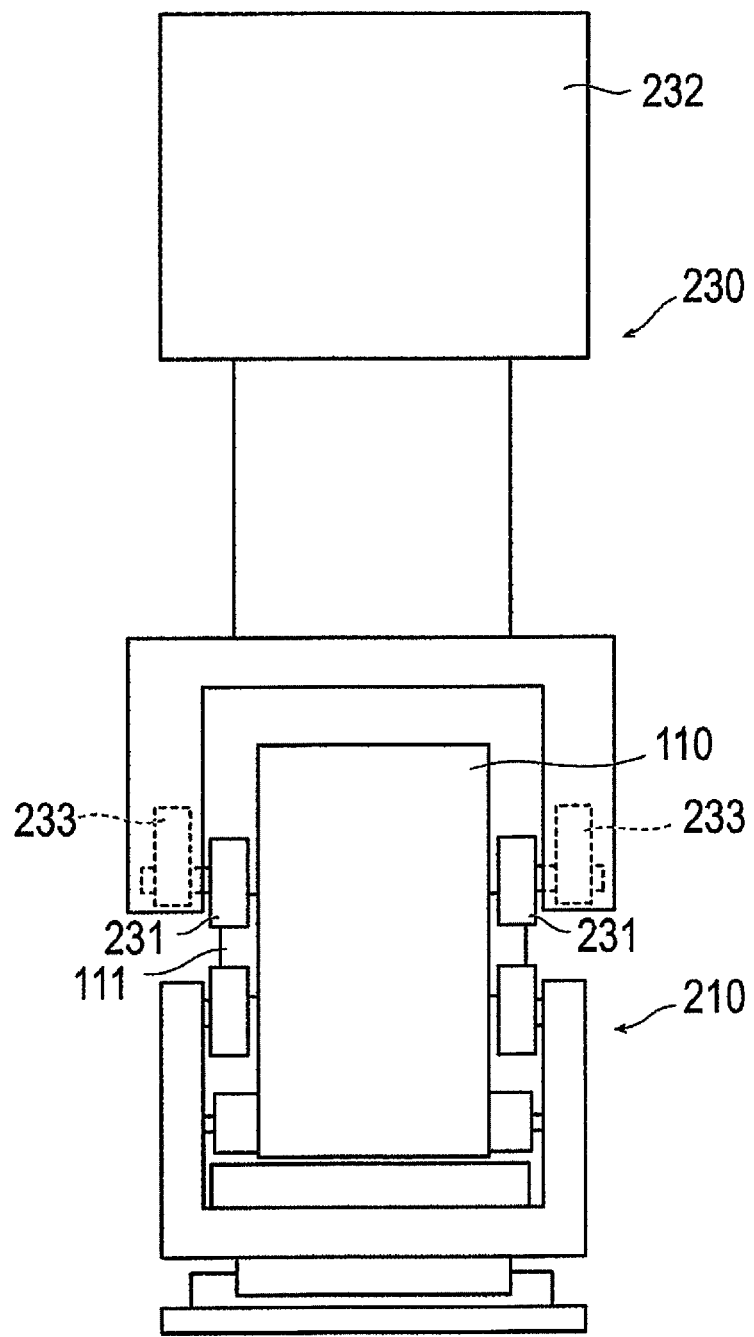
FIG. 8 is a plan view showing the roll support base supporting the supply roll and the brake force applying means.

The brake force applying means 230 is disposed above the roll support base 210, which is disposed in the connecting position A2, as shown in FIGS. 1 and 8. The brake force applying means 230 comprises braking rollers 231 capable of moving toward and away from both axial-direction ends of the core 111 of the supply roll 110 being supported on the roll support base 210, and a roller movement mechanism 232 for raising and lowering the braking rollers 231. The braking rollers 231 are connected to a braking mechanism 233 such as a brake capable of adjusting rotational load, and the rotational load is adjusted by the controller 500. The braking mechanism 233 can be a mechanical mechanism that reduces speed by converting kinetic energy into heat energy by friction, a mechanism that uses the electrical power of an electric motor or the like, or a mechanism that uses the motion resistance of a fluid, for example, but the braking mechanism is not particularly limited as long as the brake force can be controlled.

The roll detection means 240 is a laser displacement gauge disposed on the radial-direction outer side of the supply roll 110, facing the area where the cell material W is wound on the supply roll 110 supported on the roll support base 210 disposed in the connecting position A2, as shown in FIG. 1. The roll detection means 240 detects the distance to the supply roll 110 and transmits a detected signal to the controller 500. From the detected signal, the controller 500 can calculate the remaining amount of the cell material W on the supply roll 110. The roll detection means 240 is not limited to a laser displacement gauge as long as it can specify the remaining amount of the cell material W in the supply roll 110, and may be a displacement gauge that uses means other than a laser, a weight scale, or an image device such as a camera, for example.

The roll position correction means 250 comprises a drive source such as a motor or a cylinder. Controlled by the controller 500, the roll position correction means 250 pushes on and moves the upper support part 215 in a horizontal direction orthogonal to the conveying direction, the upper support part being moveably supported by the linear guide 217 of the roll support base 210.

The conveying section 300 comprises an automatic joining section 310 for joining another new cell material W to the already conveyed cell material W, a buffer section 320 capable or lengthening and shortening the conveyed route of the cell material W, and a draw-out section 330 for intermittently drawing out fixed lengths of the cell material W. Furthermore, the conveying section 300 comprises a corrective roller 340 for correcting bending in the cell material W.

The automatic joining section 310 is provided so as to be capable of linking with the roll support base 210 on the moving bases 221A, 221B. The automatic joining section 310 has the function of automatically joining the end edge Wf of a pre-replacement cell material W with the starting edge Ws of a post-replacement cell material W, when the cell material W of the supply roll 110 is at an end a new supply roll 110 is to be replaced, as shown in FIG. 22(A). The action of the automatic joining section 310 is controlled by the controller 500.

The automatic joining section 310 comprises a cutting part 311 for cutting the cell material W, a bonding part 313 for bonding cell materials W together, a joining section first clamp 315, a joining section second clamp 316, a first imaging part 317 (detecting means), and a receiving part 318 for supporting the cell material W from below, as shown in FIG. 1.

The cutting part 311 comprises a sharp cutting blade 312 that can move toward or away from the cell material W from above, and that cuts the cell material W by moving toward.

The bonding part 313 comprises a tape-affixing mechanism 314 that can move toward and away from the cell material W from above, and that affixes tape T coated on one side with a bonding agent (an adhesive) between the ending edge Wf of the previous cell material W and the starting edge Ws of the next cell material W. The tape-affixing mechanism 314 is a mechanism that presses and affixes the tape T while sequentially drawing out the tape from the roll on which the tape T is wound, for example. The configuration of the bonding part 313 is not limited as long as it is capable of bonding cell materials W together.

The joining section first clamp 315, which is disposed upstream of the cutting part 311 and the bonding part 313 and which is capable of moving toward and away from the cell material W from above, can sandwich and fix the cell material W with the receiving part 318 below.

The joining section second clamp 316, which is disposed downstream of the cutting part 311 and the bonding part 313 and which is capable of moving toward and away from the cell material W from above, can sandwich and fix the cell material W with the receiving part 318 below.

The first imaging part 317 is provided so as to be capable of observing the cell material W from above, and is capable of transmitting captured images to the controller 500. In an image captured by the first imaging part 317, the ending edge mark M of the cell material W is distinguished and used in order to specify the replacement time of the supply roll 110. Furthermore, the image captured by the first imaging part 317 is used in order to specify misalignment a (see FIG. 22(A)) of the starting edge Ws of the post-replacement cell material W, in the width direction relative to the ending edge Wf of the pre-replacement cell material W, when the supply roll 110 is being exchanged. The specified misalignment a is used as the amount by which the supply roll 110 is corrected by the roll position correction means 250.

The buffer section 320 comprises fixing rollers 321A, 321B, 321C which are rotatably provided to fixed positions and which hold the cell material W so as to allow the cell material to be conveyed, and rotatable buffer rollers 322A, 322B (moving unit) which are provided to be capable of moving and which hold the cell material W so as to allow the cell material to be conveyed. The buffer section further 320 comprises a buffer section clamp 323 (first fixing means) for holding the cell material W.

The three fixing rollers 321A, 321B, 321C are disposed in substantially horizontal alignment, and the two buffer rollers 322A, 322B, which are capable of simultaneously moving up and down, are disposed so as to be positioned alternately between the three fixing rollers 321A, 321B, 321C. The buffer rollers 322A, 322B can be moved up and down by a raising/lowering mechanism driven by a motor, a cylinder, or the like, and the movement is controlled by the controller 500. When the buffer rollers 322A, 322B are lowered, the conveying route is lengthened, and when the buffer rollers 322A, 322B are raised, the conveying route is shortened.

The buffer section clamp 323 is provided so as to be capable of moving toward and away from the upstream fixing roller 321A, and the cell material W can be sandwiched and fixed between the buffer section clamp and the fixing roller 321A.

The buffer rollers 322A, 322B are usually positioned at the lower end, and when the supply roll 110 is replaced, the buffer rollers move upward in a state in which the cell material W is held between the buffer section clamp 323 and the fixing roller 321A and the supply of the cell material W from upstream is stopped. The conveying route is thereby shortened, the shortened section of cell material W can be fed downstream, and the supply roll 110 can be replaced on the upstream side without stopping the cutting of the cell material W on the downstream side.

The draw-out section 330 comprises two fixing rollers 331A, 331B which are provided so as to be capable of rotating in fixed positions and which hold the cell material W so as to allow the cell material to be conveyed, and one draw-out roller 332 (draw-out means) which is provided so as to be capable of moving and rotating and which holds the cell material W so as to allow the cell material to be conveyed. Furthermore, the draw-out section 330 comprises a draw-out section first clamp 333 and a draw-out section second clamp 334 (second fixing means) for holding the cell material W.

The fixing rollers 331A, 331B are disposed in horizontal alignment, and the one draw-out roller 332 capable of moving up and down is disposed so as to be positioned between the two fixing rollers 331A, 331B. The draw-out roller 332 is capable of being moved up and down by a raising/lowering mechanism driven by a motor, a cylinder, or the like, and the movement is controlled by the controller 500. When the draw-out roller 332 is lowered, the conveying route is lengthened, and the when the draw-out roller 332 is raised, the conveying routed is shortened.

The draw-out section first clamp 333, which is provided so as to be capable of moving toward and away from the upstream fixing roller 331A, can sandwich and fix the cell material W with the fixing roller 331A. The draw-out section second clamp 334, which is provided so as to be capable of moving toward and away from the downstream fixing roller 331B, can sandwich and fix the cell material W with the fixing roller 331B.

The draw-out section 330 can intermittently draw out fixed lengths of the cell material W from the supply roll 110, by interlocking the draw-out roller 332, the draw-out section first clamp 333, and the draw-out section second clamp 334.

The corrective roller 340, which is a rotatable roller for holding the cell material W so as to allow the cell material to be conveyed, has the function of correcting winding creases in the cell material W which has bent due to being wound on the supply roll 110. The corrective roller 340 conveys the cell material W while bending the convex shapes of the creases into concave shapes, by being in contact with the surface of the cell material that constitutes the outer peripheral surface when the cell material is wound on the supply roll 110, i.e. the surface in which the creases are convex. The outside diameter of the corrective roller 340 is formed smaller than the outside diameters of other rollers provided to the conveying route which are in contact with the surface of the cell material W that constitutes the inner peripheral surface when the cell material is wound on the supply roll 110, i.e. the surface where the creases are concave. The cell material W in contact with the corrective roller 340 thereby bends in the opposite direction of the creases with a smaller radius of curvature than when the cell material is in contact with other rollers in contact with the opposite surface, and the creases in the cell material W are corrected.

The cutting section 400 comprises receiving bases 410 for receiving the bottom surface of the cell material W, a suction-holding conveying section 420 (conveying means) for suction-holding and moving the cell material W, and an electrode punching section 430 for punching and cutting out a positive electrode 20 from the cell material W. Furthermore, the cutting section 400 comprises a suction-holding convey-out part 440 for suction-holding and conveying out the cut out positive electrode 20, and a second imaging part 450 (confirming means, detecting means).

The suction-holding conveying section 420 (conveying means) comprises a suction-holding head 421 for exerting suction force by negative pressure due to being connected to a negative pressure supply source (not shown), the suction-holding head being installed on a robot hand (not shown) controlled by the controller 500 and being capable of moving. The suction-holding conveying section 420 is capable of conveying the cell material W by moving toward the downstream side in a state suctioning the cell material W, and of returning to the upstream side after having released the suctioning, and configures conveying means for intermittently conveying the cell material W together with the draw-out section 330 by repeating such operation. The suction-holding conveying section 420 furthermore can convey not intermittently but continuously, in a state suctioning the cell material W and without interruption of the cell material W. The suction-holding conveying section 420 and the draw-out section 330 thus are controlled by the controller 500 to intermittently convey the cell material W for each prescribed interval as a first conveying mode, or to continuously convey the cell material W as a second conveying mode.

The electrode punching section 430 is provided with a cutting blade 431 for punching a punched region U including an uncoated portion W2 on the cell material W, and a pressing device 432 controlled by the controller 500, for raising and lowering the cutting blade 431.

The suction-holding convey-out part 440 comprises a suction-holding head 441 for exerting suction force by negative pressure due to being connected to a negative pressure supply source (not shown), the suction-holding head being installed on a robot hand (not shown) controlled by the controller 500 and being capable of moving.

Figure 9:
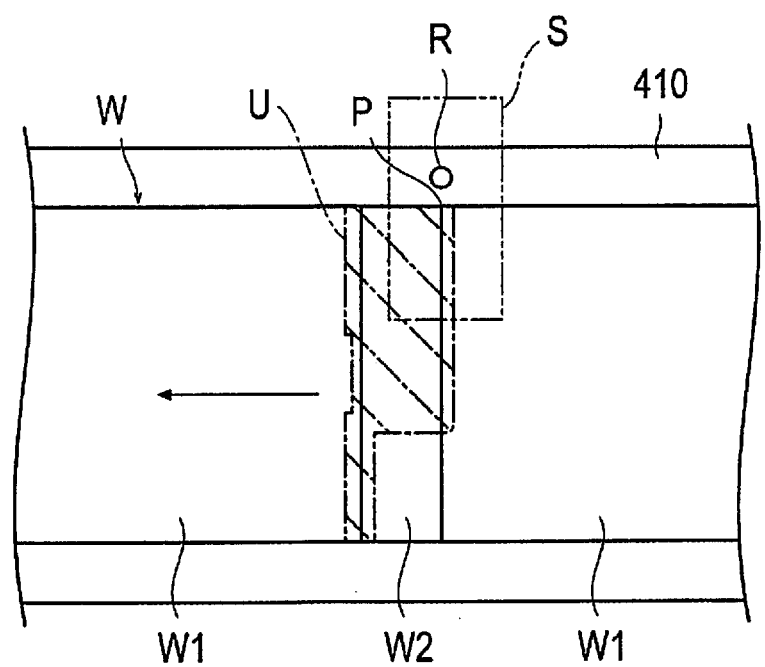
FIG. 9 is a plan view illustrating the scope of imaging using the second imaging unit.

The second imaging unit 450 (confirming means, detecting means) are provided to allow observation from above the cell material W, and is capable of transmitting a captured image to the controller 500, as illustrated in FIG. 9. The second imaging unit 450 has an imaging range S capable of imaging a plurality of reference points P corresponding to predetermined punched regions U to be punched next when the cell material W intermittently stopped in the first conveying mode. The reference points P are locations formed discontinuously on the surface of the cell material W in order to identify the position of each positive electrode 20 punched, and in the present embodiment, the reference point corresponds to one end of the coated portion W1 formed on the front end in the conveying direction.

The receiving base 410 has a fixed-position reference point R formed inside the imaging range S of the second imaging unit 450. The reference point R is formed, for example, by a hole, but the configuration is not limited provided that identification is possible using an image. The reference point R is used as a comparative object for correctly identifying the positions of the reference points P from the image taken by the second imaging unit 450.

The controller 500 confirms the presence of the reference points P on the cell material W from the image taken by the second imaging unit 450. When the reference points P cannot be confirmed from the image taken by the second imaging unit 450, the interval of the reference points P is irregular, and the presence of the connection portion W3 connected by the automatic joining section 310 can be identified on the side toward the conveying direction from the reference points P.

That is, the controller 500 continues the first conveying mode when the reference points P were confirmed within the imaging range S from the image by the second imaging unit 450 (confirming means) obtained when the cell material W intermittently stopped in the first conveying mode. The distance for the cell material W to be conveyed next by the suction-holding conveying section 420 can be correctly calculated by the controller 500 from the presence of the reference points P within the imaging range S, and the positive electrodes 20 can be successively cut out at the correct positions by the intermittent conveying by the first conveying mode.

The controller 500 determines that the connection portion W3 reached the side further downstream from the imaging range S and switches to the second conveying mode when the reference points P cannot be confirmed within the imaging range S by the second imaging unit 450 (confirming means) during the first conveying mode. In the second conveying mode, the cell material W is conveyed continuously and slowly, and the conveying continues until the reference points P are detected by the second imaging unit 450. The controller 500 also stops the conveying of the cell material W to stop the reference points P within the imaging range S, and switches to the first conveying mode, when the reference points P were detected by the second imaging unit 450. Accordingly, conveying by the second conveying mode must be performed at such a speed that the reference points P are stopped within the imaging range S after being detected by the second imaging unit 450, and is preferably performed at a lower speed than the speed of conveying in the first conveying mode. The distance for the cell material W to be conveyed next by the suction-holding conveying section 420 can be correctly calculated by the controller 500 by positioning the reference points P within the imaging range S.

When the reference point P stops within the imaging range S even though the connection portion W3 has reached the side further downstream from the imaging range S, there is no need to switch to the second conveying mode because the distance for conveying by the suction-holding conveying section 420 can be correctly calculated by the controller 500.

Figure 10:
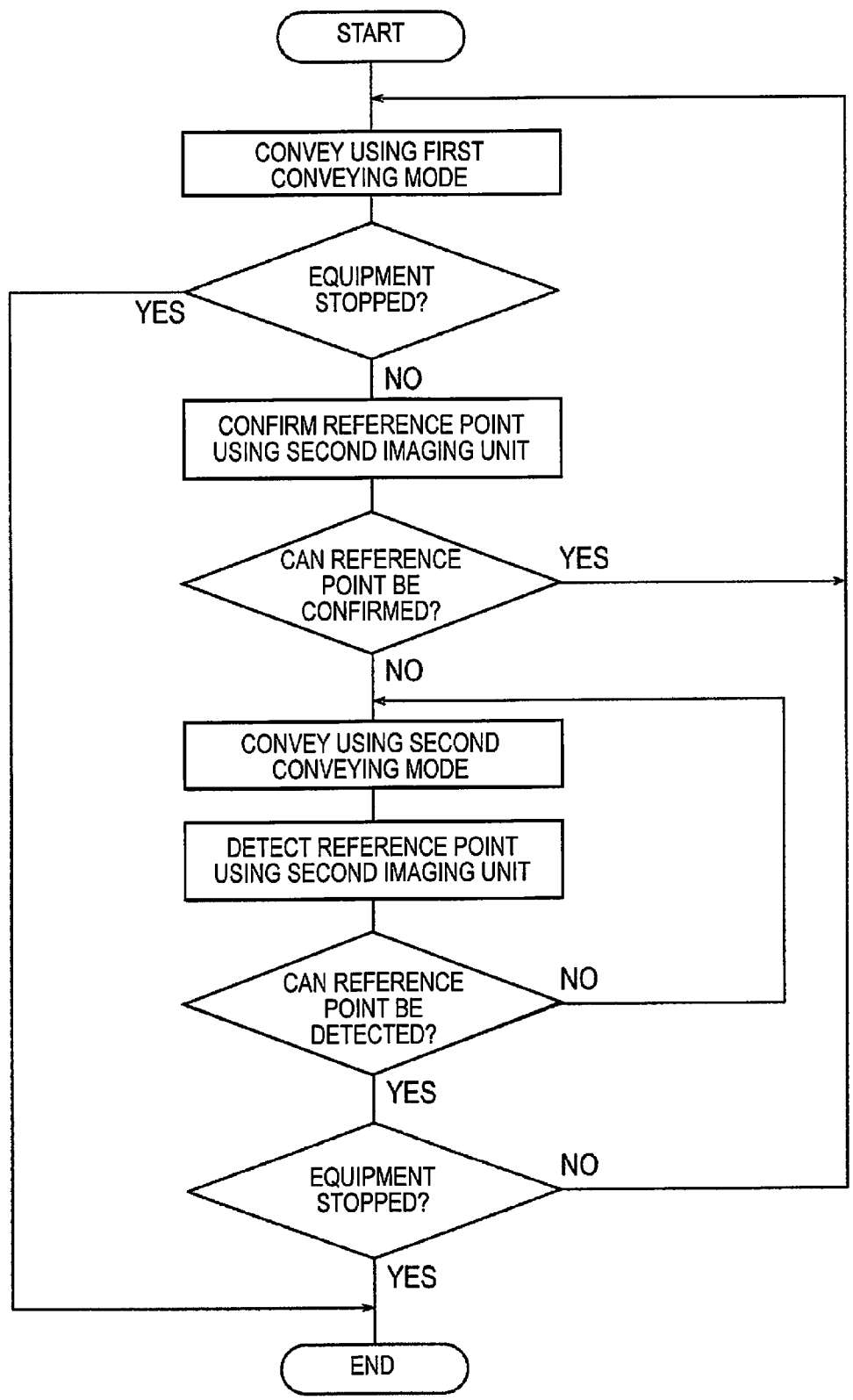
FIG. 10 is a flow chart of the flow when a cell material is conveyed by the conveyor according to the present embodiment.

The operation of the conveyor 100 according to the present embodiment is next described while referring to the flow chart illustrated in FIG. 10.

The conveyor 100 is usually used while the roll support base 210 on the moving base 221A (or 221B) is positioned in the connecting position A2 and linked with the conveying section 300, as shown in FIG. 9. At this time, the buffer rollers 322A, 322B are positioned at the lower end, and the joining section first clamp 315, the joining section second clamp 316, and the buffer section clamp 323 are not fixing the cell material W in place. The cell material W extends from the roll support base 210, through the automatic joining section 310, the buffer section 320, and the draw-out section 330, to the cutting section 400.

In the supply roll 110 of the roll support base 210, the core 111 is rotatably held by the holding rollers 212, and the core 111 is in contact with the braking rollers 231 of the brake force applying means 230. The brake force of the braking rollers 231 is adjusted by the controller 500 in accordance with the distance to the supply roll 110 as detected by the roll detection means 240. The brake force is adjusted so as to decrease as the cell material W of the supply roll 110 lessens.

Figure 12:
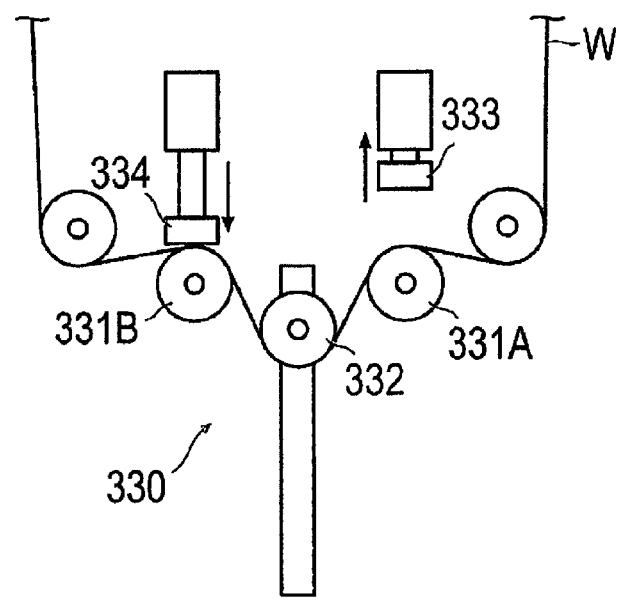
FIG. 12 is a plan view showing immediately before the cell material is drawn out from the upstream side by the draw-out section.
Figure 13:
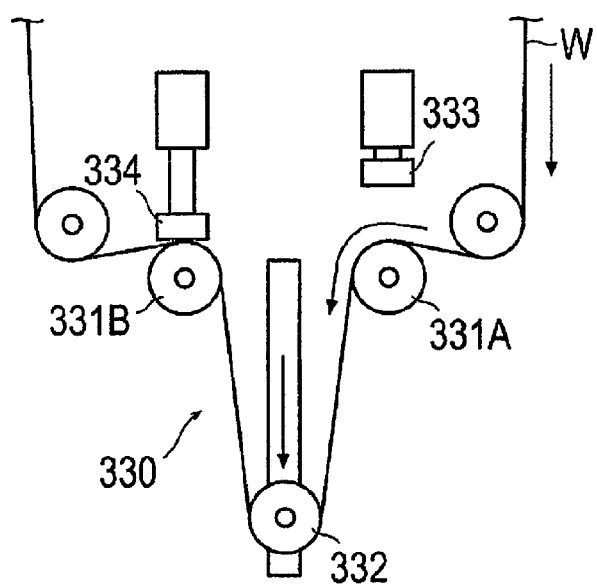
FIG. 13 is a plan view showing when the cell material is being drawn out from the upstream side by the draw-out section.

In a state in which the cell material W is fixed in place by the draw-out section second clamp 334 and the cell material W is not fixed in place by the draw-out section first clamp 333 as shown in FIG. 12, the cell material is moved under the draw-out roller 332 positioned above, and the length of the conveying route is lengthened. At this time, the cell material W downstream of the draw-out roller 332 does not move due to being fixed in place by the draw-out section second clamp 334, and the cell material W is drawn out from the upstream supply roll 110 in accordance with the change in the conveying route length as shown in FIG. 13.

When the draw-out roller 332 reaches the lower end, the cell material W stops being drawn out from the supply roll 110. At this time, the supply roll 110 would continue to rotate due to inertial force, but because brake force is being applied by the brake force applying means 230, the rotation of the supply roll 110 stops simultaneously with the stopping of the movement of the draw-out roller 332. Specifically, the brake force applied by the brake force applying means 230 is set so as to stop the rotation of the supply roll 110 simultaneously with the stopping of the movement of the draw-out roller 332. Such brake force, which depends on the inertial moment of the supply roll 110, decreases as the cell material W is drawn out from the supply roll 110. Specifically, when the brake force is set so that the supply roll 110, having much newly-replaced cell material W wound thereon, stops simultaneously with the stopping of the draw-out roller 332, the brake force becomes excessive and pulling the cell material out becomes difficult when the cell material W has been drawn out and the inertial moment of the supply roll 110 has decreased. Conversely, when the brake force is set so that the supply roll 110, from which some amount of cell material W has been drawn out, stops simultaneously with the stopping of the draw-out roller 332, a newly replaced supply roll 110 will have a large inertial moment and brake force will be insufficient. When the brake force is insufficient, the rotation of the supply roll 110 does not stop even if the draw-out roller 332 stops, more cell material W than necessary is supplied, and the cell material W slackens. Therefore, the brake force is adjusted by the controller 500 in accordance with the distance to the supply roll 110 as detected by the roll detection means 240, whereby the brake force does not depend on changes in the inertial moment of the supply roll 110, and the supply roll 110 can be intermittently rotated in a satisfactory manner.

Figure 16:
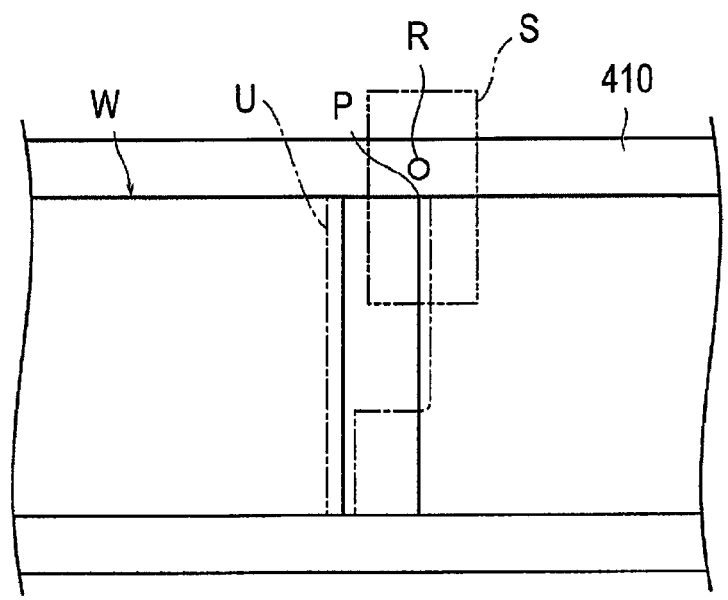
FIG. 16 is a plan view illustrating the time when the cell material stopped in the first conveying mode.
Figure 17:
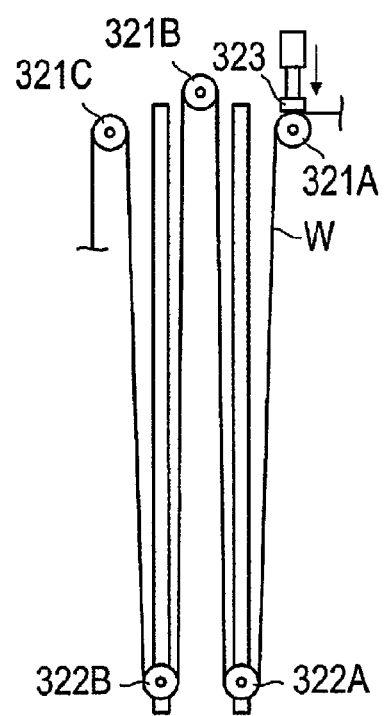
FIG. 17 is a plan view showing when the cell material is fixed in place by a buffer section clamp.
Figure 18:
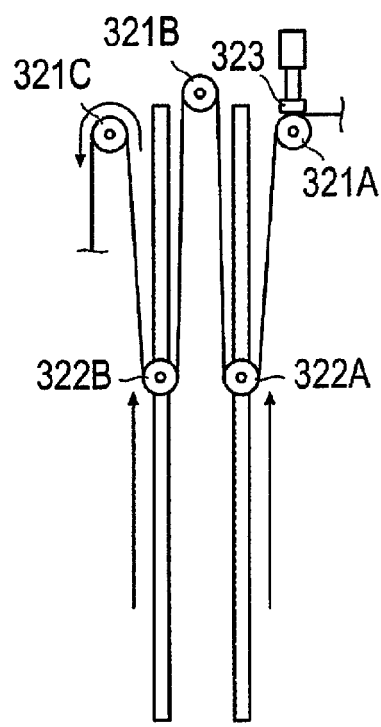
FIG. 18 is a plan view showing when the cell material is supplied to the downstream side from the buffer section.
Figure 19:
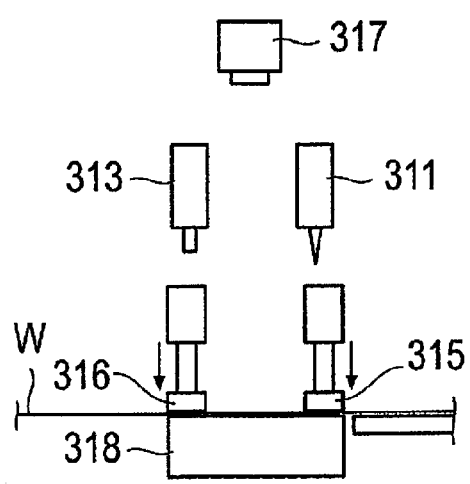
FIG. 19 is a plan view showing when the cell material is fixed in place in order for an automatic joining section to perform automatic joining.

Also, as illustrated in FIG. 16, each time the cell material W intermittently stops while continuing the first conveying mode for intermittently conveying the cell material W, the controller 500 confirms the presence of the reference points P on the cell material W from the image acquired from the second imaging unit 450 (confirming step), and discriminates whether to continue the first conveying mode or to switch to the second conveying mode (first switching step). That is, the controller 500 confirms whether the reference points P on the cell material W are or are not present within the imaging range S from the image of the time when the cell material W intermittently stopped in the first conveying mode obtained by the second imaging unit 450. When the reference points P were confirmed within the imaging range S, the controller 500 continues the first conveying mode and calculates the position of the reference points P based on the reference point R.

The controller 500 next calculates the conveying distance for the punched region U on the cell material W to be conveyed by the suction-holding conveying section 420 to the electrode punching section 430 from the calculated positions of the reference points P. The calculated distance is used when the cell material W is next conveyed by the suction-holding conveying section 420 to the electrode punching section 430.

Figure 11:
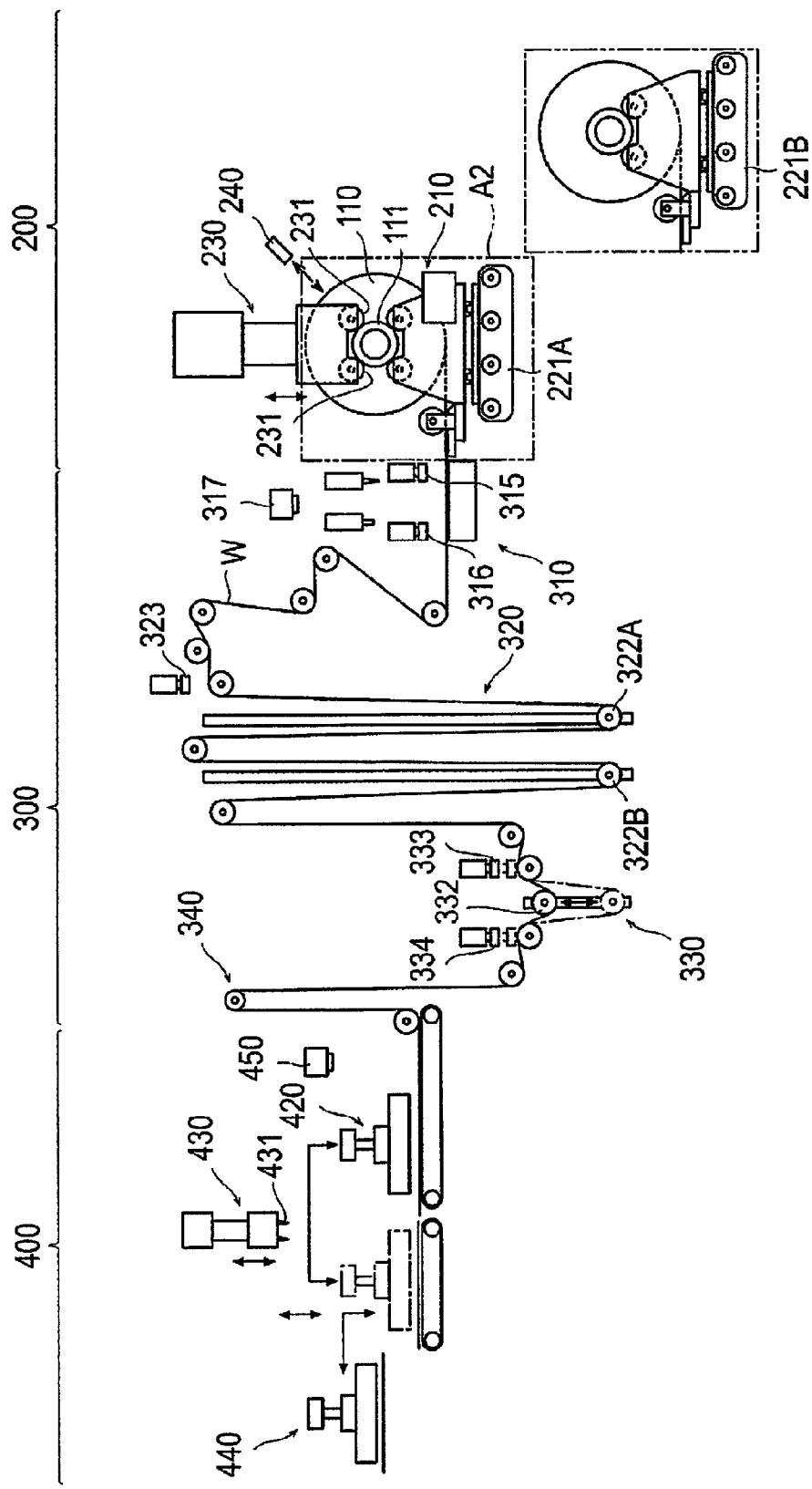
FIG. 11 is a plan view for describing the action of the conveyor according to the present embodiment.
Figure 14:
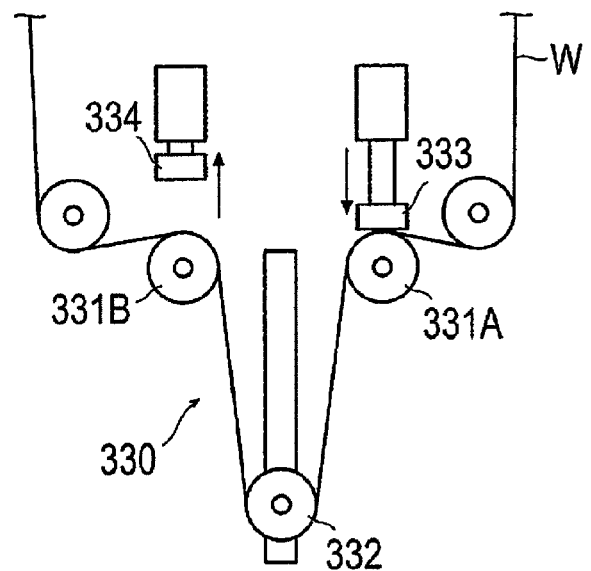
FIG. 14 is a plan view showing immediately before the cell material is conveyed to the downstream side by the draw-out section.
Figure 15:
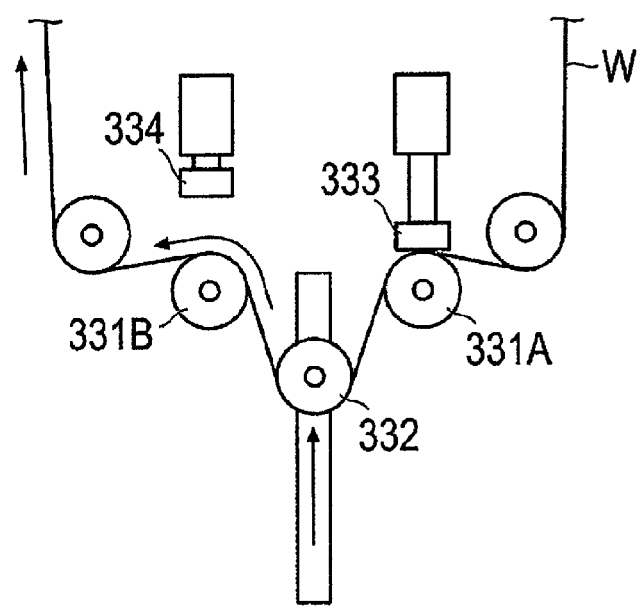
FIG. 15 is a plan view showing when the cell material is being conveyed to the downstream side by the draw-out section.

Then as illustrated in FIG. 14, the cell material W is fixed by the draw-out section first clamp 333, and the fixing of the cell material W by the draw-out section second clamp 334 is released. The suction-holding conveying section 420 of the cut-out unit 400 is positioned above the cell material W and is then lowered, and the cell material W is held by suction. The suction-holding conveying section 420 is also raised in a state holding the cell material W by suction, and the cell material W is moved to the conveying direction by the previously calculated conveying distance (first conveying step). The suction-holding conveying section 420 is then lowered, and the punched region U on the cell material W is arranged beneath the electrode punching section 430 (see FIG. 11). At this time, because the cell material W is fixed by the draw-out section first clamp 333, the cell material W on the side further upstream from the draw-out section first clamp 333 is not moved, the length of the conveyance path is shortened by the ascent of the draw-out roller 332, and the cell material W in a prescribed length is drawn out to the downstream side from the draw-out section 400, as illustrated in FIG. 15.

On the downstream side of the cutting section 400, creases are corrected so that the cell material W becomes nearly flat in a natural state with no tension, because of the corrective roller 340. The cell material W can thereby be suction-held in a satisfactory manner by the suction-holding conveying section 420, and the positive electrode 20 can be suction-held by the suction-holding convey-out part 440 in a satisfactory manner.

The pressing device 432 is next operated to lower the cutting blade 431, and the punched region U is punched, whereby the positive electrode 20 is cut out from the cell material W. The cutting blade 431 is then raised, the positive electrode 20 is held by suction by the suction-holding convey-out part 440, and the positive electrode 20 is conveyed out.

The controller 500 functions also as identifying means for identifying, as a portion that cannot be used on a product, a portion containing the connection portion W3, that is, a portion from the reference points P immediately before the reference points P could not be confirmed using the second imaging unit 450 up to a reference points P detected by the second imaging unit 450. The portion that cannot be used on the product is conveyed out by the suction-holding convey-out part 440, and is then discarded.

When the first conveying mode is continued after confirmation of the reference points P by the second imaging unit 450, a state is brought about in which the cell material W is again fixed by the draw-out section second clamp 334 and the cell material W is not fixed by the draw-out section first clamp 333, as illustrated in FIG. 12. The draw-out roller 332 being positioned upward is again moved downward in the same manner as described above, and the cell material W is drawn out from the supply roll 110 on the upstream side. The cell material W thus can be drawn out intermittently for each prescribed length in correspondence with the length of the cut-out positive electrode 20, by repeating the linked operations of the draw-out roller 332, draw-out section first clamp 333, and draw-out section second clamp 334 by the controller 500.

As the cell material W is repeatedly intermittently drawn out from the supply roll 110, the amount of cell material W on the supply roll 110 decreases. When the ending edge mark M of the cell material W reaches the imaging range of the first imaging part 317, the controller 500, which receives signals from the first imaging part 317, assesses that it is time to replace the supply roll 110, and activates the buffer section clamp 323 to fix the cell material W in place as shown in FIG. 14. Furthermore, the controller 500 activates the joining section first clamp 315 and the joining section second clamp 316 to fix the cell material W in place as shown in FIG. 16. The buffer section clamp 323 continues to fix the cell material W in place until the joining of the cell material W is complete in the automatic joining section 310. Therefore, it becomes impossible for the cell material W to be drawn out from the supply roll 110 even if the draw-out roller 332 of the draw-out section 330 is lowered, but the needed cell material W can be supplied from the buffer section 320 by raising the buffer rollers 322A, 322B to shorten the conveying route as shown in FIG. 15. The cutting out of positive electrodes 20 can thereby be continued without stopping in the cutting section 400 even when the supply roll 110 is replaced. Because there are two buffer rollers 322A, 322B provided in the present embodiment, a longer amount of cell material W can be supplied from the buffer section 320 than when there is one, and the time of replacing the supply roll 110 can continue longer.

Figure 20:
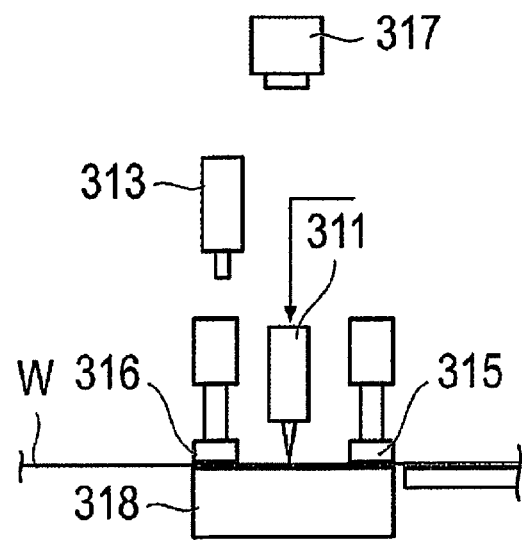
FIG. 20 is a plan view showing when the cell material is cut in the automatic joining section.
Figure 21:
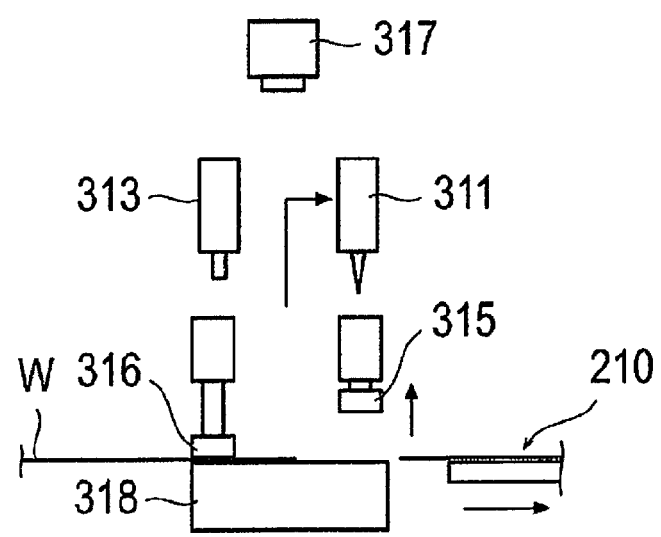
FIG. 21 is a plan view of the automatic joining section showing when the previous supply roll is conveyed out.

While positive electrodes 20 continue to be cut out, the cell material W is cut by the cutting part 311 in the automatic joining section 310 in a state in which the cell material W is fixed in place by the joining section first clamp 315 and the joining section second clamp 316, as shown in FIG. 20. The fixing of the cell material W by the joining section first clamp 315 is then released as shown in FIG. 21, and the supply roll 110 can be replaced. The fixed state of the cell material W is maintained in the joining section second clamp 316.

Next, the braking rollers 231 are raised by the roller movement mechanism 232, and the moving base 221A positioned in the connecting position A2 is moved to the convey in/out position A1, as shown in FIG. 1. In the convey in/out position A1, another roll support base 210 having a new supply roll 110 installed waits after having been installed in another moving base 221B. Therefore, at the same time that the moving base 221A holding a used up supply roll 110 is moved to the convey in/out position A1, the moving base 221B holding a new supply roll 110 is moved to the connecting position A2, whereby the supply roll 110 can be replaced in a short amount of time.

Figure 22:
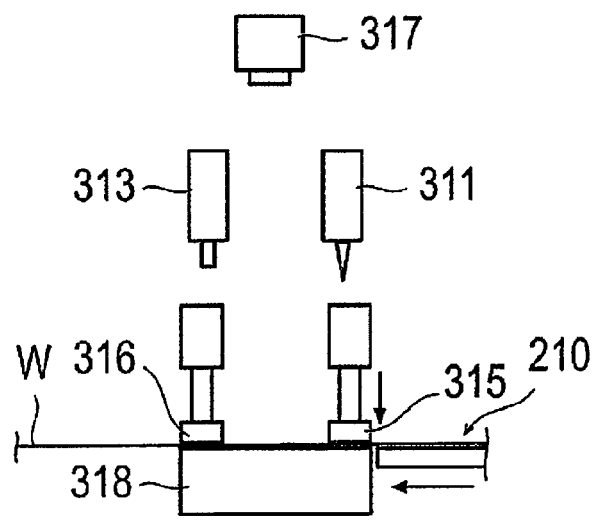
Figure 25:
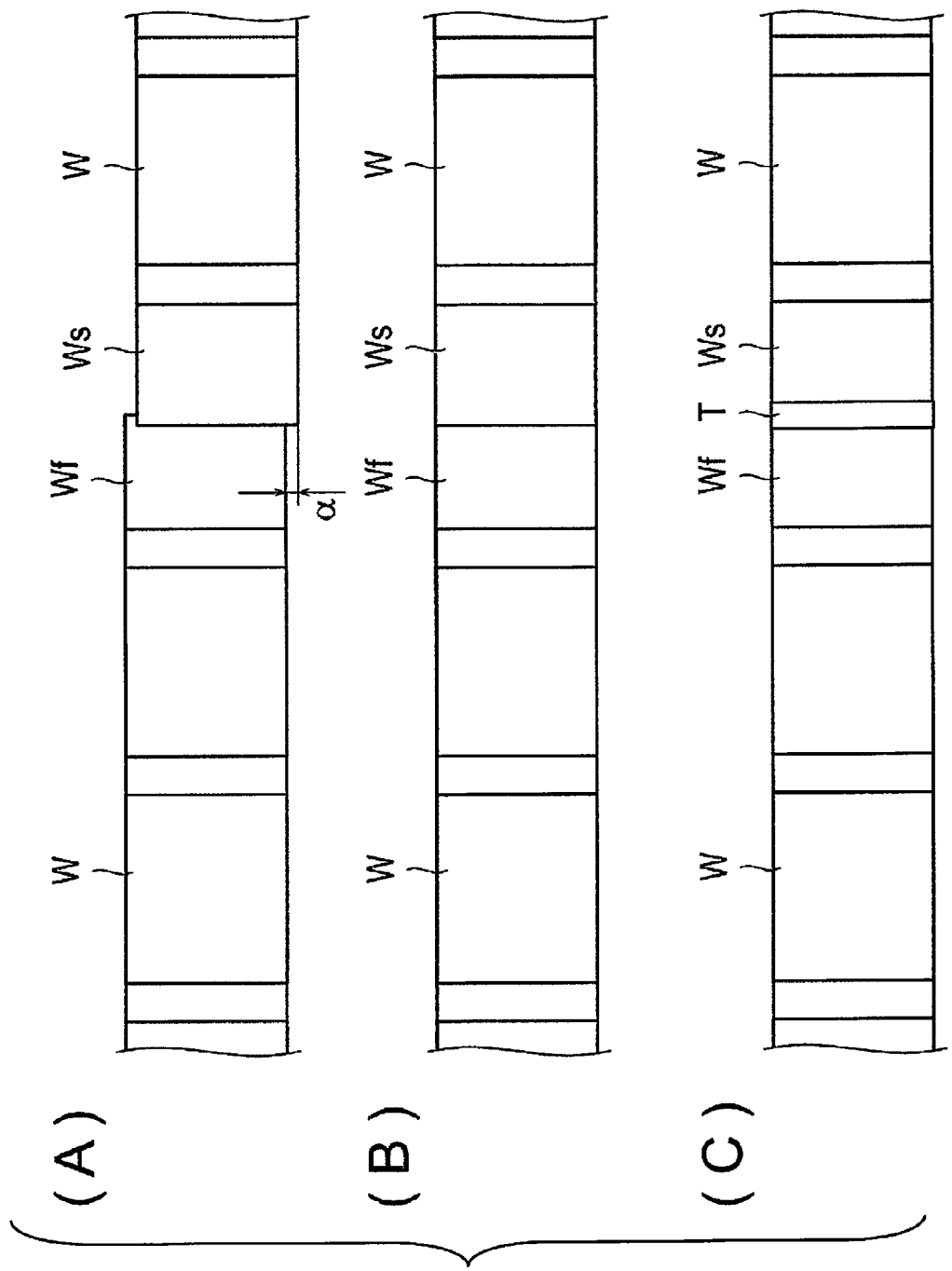
FIG. 25 are plan views showing previous cell material and new cell material, (A) showing a cell material before joining is performed, (B) showing a cell material when the position is corrected, and (C) showing a cell material after joining has been performed.

When the moving base 221B holding a new supply roll 110 is positioned in the connecting position A2, the ending edge Wf of the pre-replacement old cell material W and the starting edge Ws of the post-replacement new cell material W are imaged by the first imaging part 317 as shown in FIG. 22. The width-directional misalignment a of the starting edge Ws of the post-replacement cell material W, relative to the ending edge Wf of the pre-replacement cell material W as shown in FIG. 25(A), is specified by the controller 500. The roll position correction means 250 is then activated to move the supply roll 110 in the axial direction, using the specified misalignment a as the correction amount. When the roll position correction means 250 activates, the upper support part 215 moveably supported by the linear guide 217 moves in the roll support base 210, thereby moving the supply roll 110. The width-directional position of the starting edge Ws of the post-replacement cell material W is thereby made to coincide with the ending edge Wf of the pre-replacement cell material W, as shown in FIG. 25(B).

Figure 23:
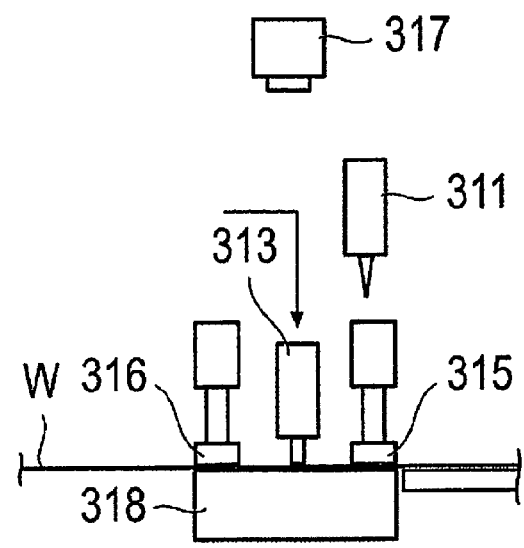
FIG. 23 is a plan view showing when cell materials are joined together in the automatic joining section.

When the width-directional position of the starting edge Ws of the post-replacement cell material W coincides with the ending edge Wf of the pre-replacement cell material W, the joining section first clamp 315 is activated to fix the starting edge Ws of the new cell material W in place, as shown in FIG. 22. The bonding part 313 is then activated to affix and bond tape T between the ending edge Wf of the pre-replacement cell material W and the starting edge Ws of the post-replacement cell material W, as shown in FIGS. 23 and 25(C).

Figure 24:
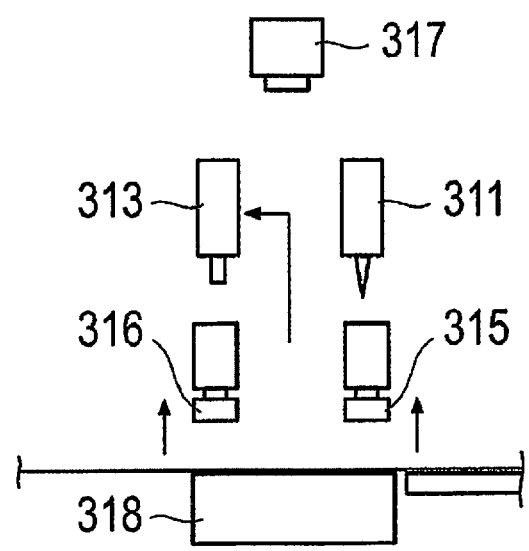
FIG. 24 is a plan view showing when joining is complete in the automatic joining section.
Figure 26:
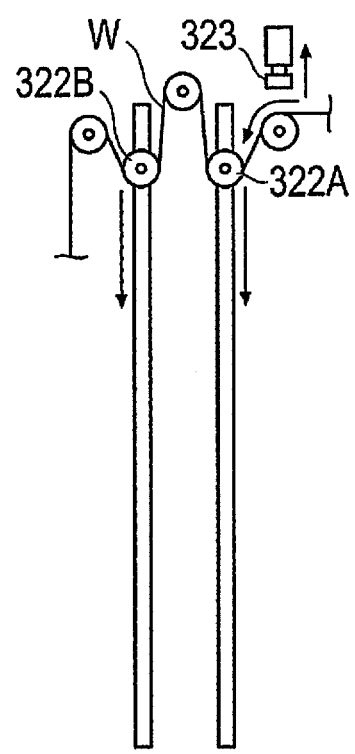
FIG. 26 is a plan view showing when the fixing in place of the cell material by the buffer section clamp is released.

When the joining of the cell materials W together is complete, the fixing of the cell material W by the joining section first clamp 315 and the joining section second clamp 316 is released as shown in FIG. 24, and the fixing of the cell material W by the buffer section clamp 323 is also released as shown in FIG. 26. All fixing of the cell material W by the plurality of clamps provided between the supply roll 110 and the draw-out section 330 is thereby released, and the cell material W can be drawn out from the supply roll 110.

The positive electrodes 20 are cut out in the cutting section 400 while the cell material W is repeatedly drawn out from the supply roll 110 by the draw-out section 330, but during this time, the buffer rollers 322A, 322B, which have moved upward, are moved until they reach the lower end. The movement of the buffer rollers 322A, 322B takes place over the course of multiple draw-out actions by the draw-out section 330. Factors such as the time required and timing of the movement of the buffer rollers 322A, 322B to the lower end are not particularly limited as long as the movement is complete by the time the next supply roll 110 is replaced.

Figure 27:
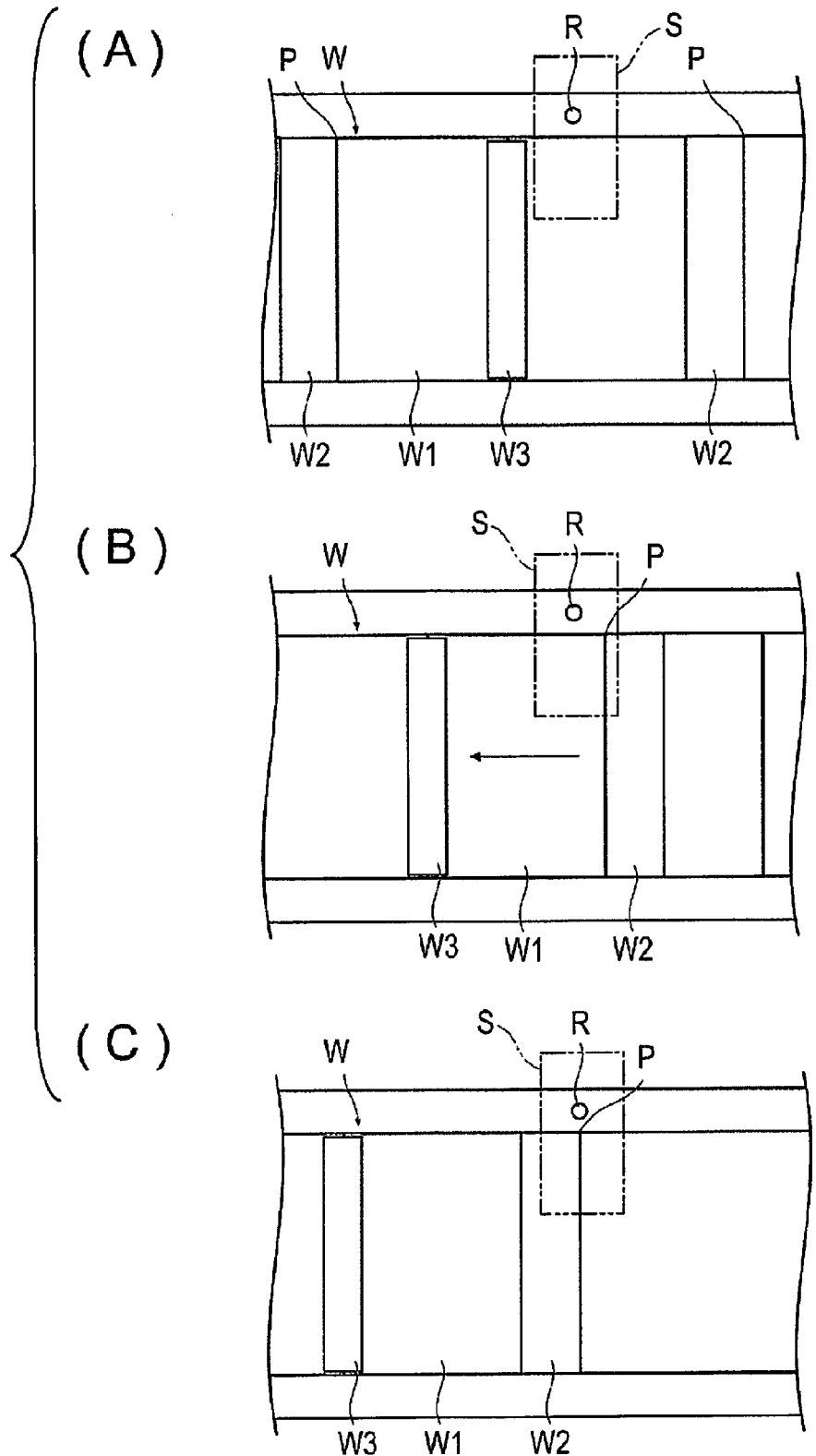
FIG. 27 are plan views illustrating the time when switching between the first conveying mode and the second conveying mode; (A) illustrates the time when the cell material is confirmed using the second imaging unit in the first conveying mode, (B) illustrates the time when having switched from the first conveying mode to the second conveying mode, and (C) illustrates the time when having switched from the second conveying mode to the first conveying mode.

When the portion joined by the automatic joining section 310 reaches the imaging range S of the second imaging unit 450, the controller 500 confirms the presence of the reference points P from the image at the instant when the cell material W intermittently stopped in the first conveying mode obtained by the second imaging unit 450 as illustrated in FIG. 27(A). When the reference points P are not confirmed to be within the prescribed imaging range S by the second imaging unit 450 (confirming means), the controller 500 switches from the first conveying mode to the second conveying mode (first switching step) because the length in the conveying direction of the coated portion W1 is not optimal. When the reference point P stops within the imaging range S even though the connection portion W3 has reached the side further downstream from the imaging range S (the left side of the page in FIG. 27), there is no need to switch to the second conveying mode because distance for conveying by the suction-holding conveying section 420 can be correctly calculated by the controller 500.

When the mode is switched to the second conveying mode, the controller 500 again controls to raise the suction-holding conveying section 420 holding the cell material W by suction, and the cell material W is continuously conveyed without interruption (second conveying step) as illustrated in FIG. 27(B). The controller 500 also controls to release the fixing of the cell material W by the draw-out section first clamp 333 (see FIG. 11) during the second conveying mode, and to allow drawing out of the cell material W from the supply roll 110.

The controller 500 also attempts to detect (detecting step) the reference points P on the cell material W by the second imaging unit 450 (detecting means) while continuing continuous conveying of the cell material W by the second conveying mode. When the reference points P are detected by the second imaging unit 450, the controller 500 controls to stop and lower conveying by the suction-holding conveying section 420, controls to stop the reference point P within the imaging range S, and switches to the first conveying mode (second switching step). The position of the reference points P can thereby be identified by the second imaging unit 450, and the punched region U can be fixed in position with high precision relative to the electrode punching section when the cell material W is next conveyed by the suction-holding conveying section 420.

The positive electrodes 20 successively cut out are layered with negative electrodes 30, sandwiching separators 40 in between in a later step, and a layered electrode body 11 is configured.

The conveyor 100 according to the present embodiment as above has a suction-holding conveying section 420 (conveying means), a second imaging unit 450 (confirming means, detecting means), and a controller 500 (control means). The suction-holding conveying section 420 conveys a belt-shaped cell material W (work) having a plurality of reference points P arrayed discontinuously on a surface, intermittently conveying for each prescribed interval as a first conveying mode or continuously conveying as a second conveying mode. The second imaging unit 450 (confirming means) confirms the reference points P on the cell material W when the cell material W intermittently stopped in the first conveying mode. The second imaging unit 450 (detecting means) furthermore monitors the cell material W conveyed using the second conveying mode and detects the reference points P. The controller 500 continues the first conveying mode when the reference points P were confirmed using the second imaging unit 450 in the first conveying mode, and switches to the second conveying mode when the reference points P is not confirmed using the second imaging unit 450. The controller 500 furthermore continues the second conveying mode until the reference points P are detected by the second imaging unit 450 in the second conveying mode, and switches to the first conveying mode when the reference points P were detected by the second imaging unit 450. Accordingly, while the cell material W is intermittently conveyed at high speed by the suction-holding conveying section 420 for each portion corresponding to a positive electrode 20 in the first conveying mode, a portion in which the interval of the reference points P was formed irregularly can be identified by confirming the reference points P by the second imaging unit 450. Therefore, the cell material W can be easily returned to the proper position because the reference points P can be detected by the second imaging unit 450 while the cell material W is conveyed using the second conveying mode. Moreover, because the reference points P is detected while the cell material W is moved by the second conveying mode, there is no need to detect a wide range of the cell material W, and therefore it can be arranged so that only a narrow range is detected by the second imaging unit 450. The resolving power using the second imaging unit 450 can therefore be improved, and the precision of processing the positive electrode 20 can be improved. Moreover, the precision of processing can be maintained without using a high-performance (high-resolution) imaging device for the second imaging unit 450.

Also because the speed of continuous conveying of the cell material W during the second conveying mode is slower than the speed of conveying of the cell material W during the first conveying mode, detection of the reference points P by the second imaging unit 450 becomes easy, and inexpensive detecting means moreover can be used for the second imaging unit 450.

Also because each of the reference points P is an end of each coated portion W1 on the cell material W having a plurality of coated portions W1 intermittently coated on a belt-shaped conductive member, the performance of the cell 10 (product) can be secured more assuredly because an appropriate length is set based on the coated portion W1, which is important for performance of the cell 10. Moreover, there is no need to form the reference points P separately, and reduction of manufacturing cost or shortening of processing time therefore can be accomplished.

The conveyor 100 according to the present embodiment also has a controller 500 (identifying means) for identifying, as a portion that cannot be used on a product, a portion from the reference points P immediately before the reference points P could not be confirmed using the second imaging unit 450 (confirming means) up to a reference point P detected by the second imaging unit 450 (detecting means). Accordingly, an unwanted portion can be easily identified, and reduction of manufacturing cost or shortening of processing time can be accomplished.

The present invention is not limited to the embodiment described above, and can be modified as appropriate. For example, the cell need not be a secondary cell. The present invention may also be applied to the conveying of negative electrodes 30 or separators 40, rather than the conveying of positive electrodes 20. The invention is also applicable beyond cell materials W provided that the work has a band form.

In the present embodiment, the second imaging unit 450 is used as confirming means for confirming the reference points P on the cell material W in the first conveying mode, and the second imaging unit 450 is used also as detecting means for monitoring the cell material W and detecting the reference points P in the second conveying mode, but the confirming means and the detecting means may be configured using different sensors.

The invention claimed is:

1. A conveyor comprising:
a conveyor section configured to convey a belt-shaped work having a plurality of reference points arrayed discontinuously on a surface;
a controller programmed to selectively operate the conveyor section for intermittently conveying the work for each prescribed interval as a first conveying mode and continuously conveying the work as a second conveying mode;
a confirming part configured to confirm the reference points on the work from a fixed position when the work is intermittently stopped in the first conveying mode; and
a detecting part configured to monitor the work conveyed while the conveyor section is in the second conveying mode and to detect the reference points; and
the controller being further programmed to selectively operate the conveyor section for continuing the first conveying mode when the reference points are confirmed by the confirming part during the first conveying mode and switching to the second conveying mode when the reference points are not confirmed by the confirming part, and
the controller being further programmed to selectively operate the conveyor section for continuing the second conveying mode until the reference points are detected by the detecting part during the second conveying mode and switching to the first conveying mode when the reference points are detected by the detecting part.

2. The conveyor according to claim 1, wherein
the controller is further programmed to selectively operate the conveyor section such that a speed of continuous conveying during the second conveying mode is less than a speed of conveying the work in the first conveying mode.

3. The conveyor according to claim 1, wherein
the reference points correspond to ends of each coated portion on the work having a plurality of coated portions intermittently coated on a belt-shaped base material.

4. The conveyor according to claim 1, wherein
the controller is further programmed to identify a portion of the work that cannot be used on a product as corresponding to a portion of the work from the reference points immediately before a time when the reference points could not be confirmed by the confirming part up to the reference points detected by the detecting part.

5. A conveying method comprising:
intermittently conveying a belt-shaped work having a plurality of reference points arrayed discontinuously on a surface for each prescribed interval as a first conveying mode;
continuously conveying the work as a first conveying mode;
confirming the reference points on the work from a fixed position when the work is stopped intermittently in the first conveying mode;
continuing the first conveying mode when the reference points were confirmed and switching to the second conveying mode when the reference points are not confirmed;
monitoring the work conveyed in the second conveying mode and detecting the reference points; and
continuing the second conveying mode until the reference points are detected and switching to the first conveying mode when the reference points are detected.

6. The conveying method according to claim 5, wherein
a speed of continuous conveying in the second conveying mode is less than a speed of conveying the work in the first conveying mode.

7. The conveying method according to claim 5, wherein
the reference points correspond to ends of each coated portion on the work having a plurality of coated portions intermittently coated on a belt-shaped base material.

8. The conveying method according to any of claims 5 to 7, further comprising
identifying a portion of the work that that cannot be used on a product as corresponding to a portion of the work from the reference points immediately before a time when the reference points could not be confirmed up to when the reference points that were detected.

* * * * *